United States Patent [19]

Nishimura et al.

[11] 4,313,621
[45] Feb. 2, 1982

[54] SEATBELT SYSTEM

[75] Inventors: Yuji Nishimura, Nagoya; Tatsushi Kubota, Okazaki, both of Japan

[73] Assignees: Toyota Jidosha Kogyo Kabushiki Kaisha; Kabushiki Kaisha Tokai Rika Denki Seisakusho, both of Aichi, Japan

[21] Appl. No.: 90,405

[22] Filed: Nov. 1, 1979

[30] Foreign Application Priority Data

Nov. 10, 1978 [JP] Japan .......................... 53-154794[U]

[51] Int. Cl.³ ............................................. B60R 21/10
[52] U.S. Cl. .................................................... 280/804
[58] Field of Search ............... 280/802, 803, 804, 801; 180/268, 286

[56] References Cited

U.S. PATENT DOCUMENTS 2,945,546 7/1960 Niederoest .......................... 180/286
3,788,685 1/1974 Leichtl ................................ 180/286
3,866,944 2/1975 Takahashi .......................... 180/286
3,900,078 8/1975 Otani .................................. 280/804

Primary Examiner—John P. Silverstrim
Attorney, Agent, or Firm—Koda and Androlia

[57] ABSTRACT

A slider engaging an occupant restraining webbing is driven to move along a guide rail laid on a roof side of the vehicle, whereby a webbing can be automatically fastened to an occupant. One-way latch means is provided which allows the slider to move only to an automatically fastening position but does not allow same to move in the direction opposite to the above, whereby the slider is prevented from moving in a collision of the vehicle, thereby securing the safety of the occupant.

5 Claims, 13 Drawing Figures

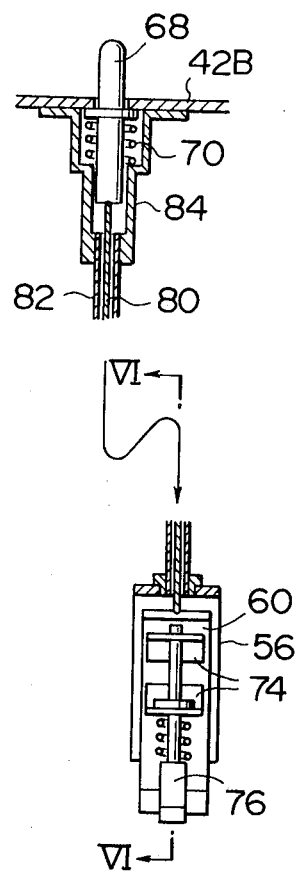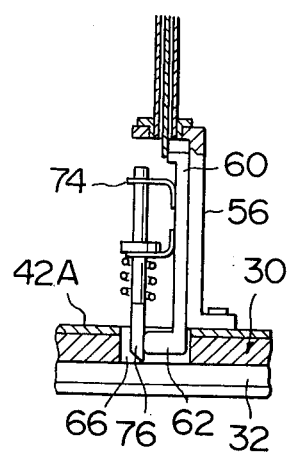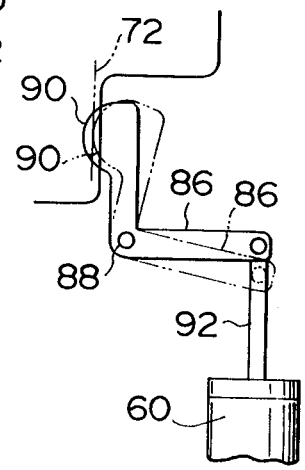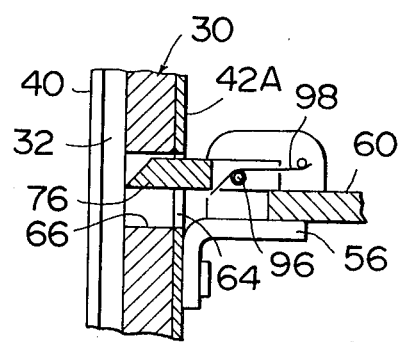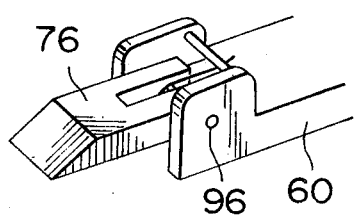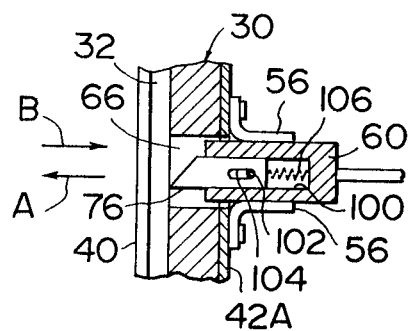

SEATBELT SYSTEM

BACKGROUND OF THE INVENTION

1. Field of the Invention

The present invention relates to a seatbelt system for restraining and protecting an occupant in an emergency of a vehicle, and particularly to a seatbelt system for automatically fastening webbings for restraining to the occupant after he is seated.

2. Description of the Prior Art

Heretofore, there has been proposed a seatbelt system for automatically fastening a webbing for restraining to an occupant after he is seated. In said seatbelt system, a slider is slidably guided in a guide rail laid on the vehicle body, an outer end of the webbing is secured to said slider, whereby the outer end of the webbing is caused to approach or be separated from an occupant's seat, thereby bringing the webbing into contact with or separating same from the seated occupant.

In said automatically fastening type seatbelt system, it is necessary that said slider should be reliably engaged with the vehicle body at an automatically fastening position to which said slider reaches after moving in a direction of the occupant's seat along the guide rail. More particularly, in an emergency of the vehicle, a high tension is generated in the webbing due to a colliding inertial force of the occupant. Hence, it is necessary to make the vehicle body reliably support the tension, so that the occupant can be reliably restrained by the webbing.

From this reason, heretofore, there has been proposed means of preventing the slider from moving by use of a locking device such as a solenoid driven by an electric power source of the vehicle when the slider reaches the automatically fastening position. However, such means has been complicated in construction and tended to cause unexpected failures due to interruption of power supply in a collision of the vehicle.

SUMMARY OF THE INVENTION

The present invention contemplates to obviate the abovedescribed disadvantages, and therefore, an object of the present invention is to provide a seatbelt system being simple in construction, wherein, after the webbing is automatically fastened to the occupant, the outer end of the webbing is reliably engaged with the vehicle body, thereby improving the occupant restraining performance.

In the seatbelt system according to the present invention, when the door for entering or leaving the vehicle is closed, a locking plate is caused to project into a moving path of the slider to prevent the slider from moving in a direction of an unfastening position, and one-way latch means allows the slider to move in the direction of the automatically fastening position, so that the slider can move to the automatically fastening position after the door is closed.

Description will hereunder be given of the embodiments of the present invention with reference to the drawings.

BRIEF DESCRIPTION OF THE DRAWINGS

FIG. 5 is a cross-sectional view corresponding to FIG. 2, in which a second embodiment of the present invention is shown;

FIG. 6 is a cross-sectional view taken along the line VI—VI in FIG. 5;

FIG. 7 is a cross-sectional view corresponding to FIG. 2, in which a third embodiment of the present invention is shown;

FIG. 8 is a cross-sectional view corresponding to FIG. 3, in which a fourth embodiment of the present invention is shown;

FIG. 9 is a partial, perspective view of FIG. 8; and

FIG. 10 is a cross-sectional view corresponding to FIG. 3, in which a fifth embodiment of the present invention is shown.

DESCRIPTION OF THE PREFERRED EMBODIMENT

Figure 1:
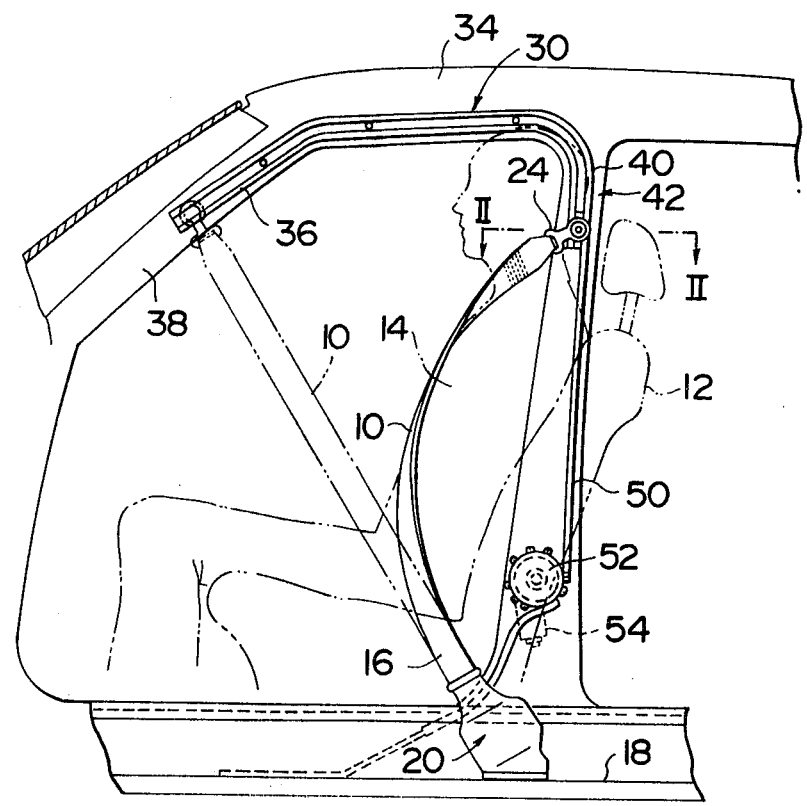
FIG. 1 is a side view showing a first embodiment of the seatbelt according to the present invention.
Figure 2:
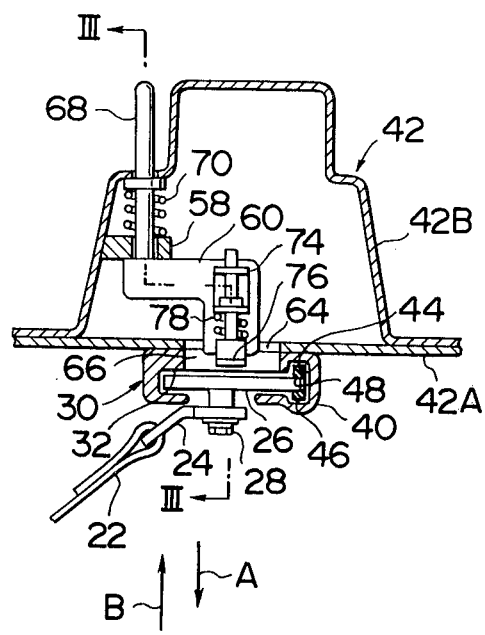
FIG. 2 is a cross-sectional view taken along the line II—II in FIG. 1.
Figure 3:
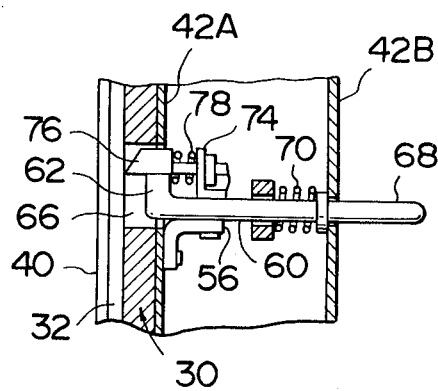
FIG. 3 is a cross-sectional view taken along the line III—III in FIG. 2.

FIGS. 1 through 3 show the first embodiment of the present invention, in which a webbing 10 for restraining an occupant is obliquely, surroundingly fastened to the occupant 14 seated at an occupant's seat 12. An inner end portion 16 of said webbing 10 is wound up by a retractor 20 secured to a floor member 18 provided at the substantially central portion of the vehicle. Said retractor 20 is adapted to wind up the webbing 10 by a biasing force thereof and incorporates therein an inertia lock mechanism for suddenly stopping the windoff of the webbing in an emergency of the vehicle.

On the other hand, an outer end portion 22 of webbing 10, as shown in FIG. 2, is turned back at an anchor plate 24 and sewn onto itself, thus being engaged with said anchor plate 24. Said anchor plate 24 is rotatably, pivotally supported by a bolt 28 erected from a slider 26.

The slider 26 is received in a guide groove 32 being substantially rectangular in cross section, which is cuttingly provided in a guide rail 30 in the longitudinal direction thereof, and movable along said guide groove 32 in the longitudinal direction of the guide rail 30. The central portion of the guide rail 30 is laid on a roof side 34 of the vehicle in the substantially horizontal direction, the forward end portion 36 of the guide rail 30 descends along a front pillar 38, and a vertical portion 40 at the rear end of the guide rail 30 is bent at a substantially right angle with said central portion, and thereafter, hangs down along a center pillar 42. Here, when the slider 26 and the anchor plate 24 reach the lower end of said vertical portion 40 as indicated by solid lines in FIG. 1, an automatic fastening position is attained which enables the webbing 10 to be surroundingly attached to the occupant 14. Furthermore, when the slider 26 reaches the forward end portion 36 of the guide rail 30, the webbing 10 is separated from the occupant's seat 12 and moved forward in the vehicle as indicated by two-dot chain lines in FIG. 1, and an unfastening position is attained which enables to form a space for the occupant to enter or leave the vehicle.

As shown in FIG. 2, said guide rail 30 is cuttingly provided therein with a tape groove 44 connected to one end of the guide groove 32 perpendicularly to the guide groove 32 in the longitudinal direction, said tape groove 44 receiving therein a tape 46. Said tape 46 is penetratingly provided therein with a multiplicity of openings 48 in the longitudinal direction thereof, and part of the slider 26 is inserted into one of said openings 48, whereby the slider 26 is engaged with the tape 46. As partially shown in FIG. 1, said tape 46 is guided in an auxiliary slide rail 50 descending from the lower end portion of said vertical portion 40 along the center pillar 42, and the lower end portion of the auxiliary slide rail 50 is communicated with a sprocket housing 52 secured to the lower portion of the center pillar 42, whereby said tape 46 is guided into the sprocket housing 52. Pivotally supported in said sprocket housing 52 is a sprocket not shown with which is meshed an opening of said tape 46.

Said sprocket in the sprocket housing 52 is adapted to be driven by a motor 54 secured to the center pillar 42, and said motor 54 is adapted to detect the seated condition of the occupant to move the tape 46 along the guide rail 30. As exemplified here, when the occupant opens the door, the motor 54 moves the anchor plate 24 in the direction of the unfastening position. In contrast to the above, when the door is closed, the anchor plate 24 is moved in the direction of the automatically fastening position.

Next, as shown in FIGS. 2 and 3, in the center pillar 42, a slide piece 60 is movable being guided by a base 56 solidly secured to an inner plate 42A of the center pillar and a guide 58 solidly secured to an outer plate 42B of the center pillar. The moving direction of said slide piece 60 is laterally of the vehicle, either inwardly to the cabin (indicated by an arrow A) or outwardly from the cabin (indicated by an arrow B).

A hook portion 62 provided at an end portion of said slide piece 60 on the side of the interior of cabin is located in a rectangular opening 64 formed in the inner plate 42A of the center pillar, and, when moved inwardly to the cabin (indicated by the arrow A) to the maximum, said hook portion 62 enters a rectangular opening 66 formed in the guide rail 30 through said rectangular opening 64, but does not enter the guide groove 32 of the guide rail 30 constituting a moving path for the slider 26.

Furthermore, the other end portion of said slide piece 60 projects from the outer plate 42B of the center pillar outwardly from the vehicle to constitute a door checker 68. Said door checker 68 is projected outwardly from the vehicle by a biasing force of a compression coil spring 70 confined between the guide 58 and the door checker 68, and, when the vehicle door 72 is closed, said door checker 68 is moved inwardly toward the cabin against the biasing force of the compression coil spring 70.

Additionally, said hook portion 62 is provided thereon with a locking plate 76 guided by a letter 'U' shaped guide plate 74 solidly secured to the intermediate portion of the slide piece 60 to move laterally of the vehicle relative to the slide piece 60. When the slider 26 reaches the automatically fastening position, said locking plate 76 is adapted to be disposed above the slider 26, has been moved inwardly toward the cabin by a biasing force of a compression coil spring 78 confined between the guide plate 74 and said locking plate 76, and, when the door is closed to move the slide piece 60, said locking plate 76 is adapted to project into the guide groove 32 of the guide rail 30 as shown in FIG. 4B. Furthermore, the end portion of said locking plate 76 on the side of the interior of cabin is made into a triangular shape as shown in FIG. 3 as viewed in the horizontal direction, and said end portion and the compression coil spring 78 constitute a one-way latch means. Namely, the forward end portion of said locking plate 76, when the door is closed, is projected into the guide groove 32 of the guide rail 30 due to the movement of the slide piece 60, and, if said locking plate 76 is moved in this condition in the direction of the automatically fastening position, then said locking plate 76 comes into contact with the slider 26 to be moved outwardly from the cabin, thus enabling the slider 26 to move in the direction of the automatically fastening position. Additionally, when the slider 26 is at the automatically fastening position, said locking plate 76 comes into abutting contact with said slider to prevent said slider to move in the direction of the unfastening position.

Figure 4A:
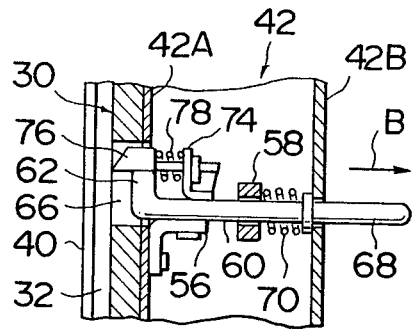
FIGS. 4A through 4D show the operational diagrams of FIG. 3.
Figure 4B:
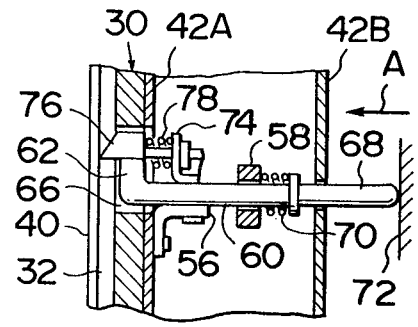

In the present embodiment as arranged above, when the occupant opens the door to leave the vehicle, the slide piece 60 moves in the direction of the exterior of cabin as shown in FIG. 4A, whereby the locking plate 76 is released from the guide groove 32. Simultaneously with this, the motor 54 drives the tape 46, whereby the slider 26 is moved in the guide rail 30, thus moving the webbing 10 to the unfastening position as indicated by two-dot chain lines in FIG. 1.

Consequently, the occupant can readily leave the vehicle, and, if the occupant closes the door upon being seated after entering the vehicle again, the slide piece 60 abuts against the door 72 as shown in FIG. 4B to be moved inwardly to the cabin, whereby the locking plate 76 projects into the guide groove 32.

Figure 4C:
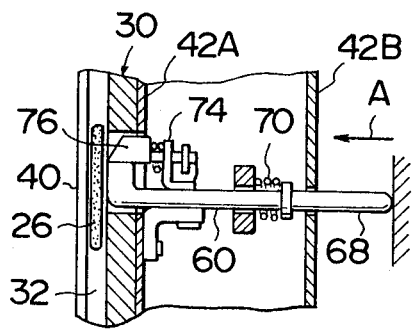
Figure 4D:
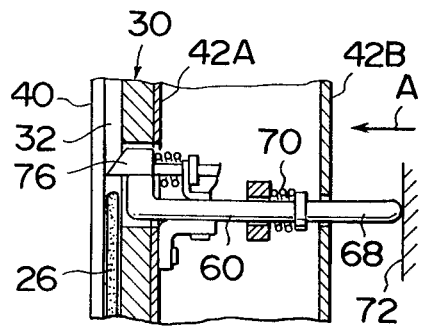

Simultaneously with this, the motor 54 is rotated in the reverse direction to move the slider 26 in the direction of the automatically fastening position along the guide rail 30. When said slider 26 passes through the vertical portion 40 in the guide rail 30, said slider 26 pushes the locking plate 76 into the center pillar 42 while abutting against the forward end portion of the locking plate 76 as shown in FIG. 4C, whereby said slider 26 can easily move to the automatically fastening position, so that said slider 26 can be more lowered than the locking plate 76 to attain the automatically fastening position as shown in FIG. 4D.

In this condition, the webbing 10 can be automatically fastened to the occupant as indicated by solid lines in FIG. 1. In an emergency of the vehicle such as a collision, an inertia lock mechanism in the retractor 20 is actuated to suddenly interrupt the windoff of the webbing 10, and the slider 26 remains in the vertical portion 40 of the guide rail 30, whereby the slider 26 is prevented from moving in the forward or rearward direction of the vehicle, so that the occupant 14 can be reliably restrained by the webbing 10, thereby securing the safety of the occupant.

Furthermore, when the vehicle is turned over, the slider 26 is prevented from moving to the unfastening position by the locking plate 76, whereby the outer end portion 22 of the webbing 10 does not move, so that the occupant can be maintained in a reliably restrained condition in this case too.

When the occupant opens the door to leave the vehicle upon completing normal running, the slide piece 60 moves outwardly from the vehicle as shown in FIG. 4A similarly to the condition of entering the vehicle, and consequently, the locking plate 76 is released from the guide groove 32, so that the slider 26 can be moved in the direction of the unfastening position.

Next, FIGS. 5 and 6 show a second embodiment of the present invention. In this embodiment, a wire 80 connects the door checker 68 to the slide piece 60, and said wire 80 is received in an outer tube 82. Said outer tube 82 is secured at one end thereof to a cylindrical cover 84 for protecting the door checker fixed to the interior of the outer plate 42B of the center pillar, and secured at the other end to the base 56.

Accordingly, in this embodiment too, similarly to the preceding embodiment, the door checker 68 can detect the open or closed condition of the door to project the locking plate 76 into the guide groove 32 through the wire 80, and further, in this embodiment, the distance between the door checker 68 and the locking plate 76 can be enlarged.

Next, FIG. 7 shows a third embodiment of the present invention. In this embodiment, in place of the door checker 58, a rocker arm 86 is used. The intermediate portion of said rocker arm 86 is pivotally supported by a center pillar 42 through a pin 88, a circularly arcuate projection 90 provided at one end of said rocker arm 86 is adapted to project to the outside of the vehicle through the outer plate 42B of the center pillar, and, when the door is closed, said circularly arcuate projection 90 is pushed into the center pillar 42 to move the slide piece 60 through a connecting bar 92 connected to the other end of said rocker arm 86. Consequently, also the same advantages can be obtained in this embodiment as in the previous embodiments.

Next, FIGS. 8 and 9 show a fourth embodiment of the present invention. This embodiment shows another example of the one-way latch means. More specifically, the locking plate 76 is pivotally supported by the end portion of the slide piece 60 on the vehicle's side through a pin 96, and, when said locking plate 76 is projected into the guide groove 32 to allow the slider 26 to move to the automatically fastening position, the locking plate 76 is turned about the pin 96 against the biasing force of the torsional coil spring 98, so that the slider 26 is movable to the automatically fastening position. Additionally, when the slider is moved in the direction opposite to the above, the locking plate 76 abuts against the rectangular opening 66 of the guide rail or the slide piece 60, thereby preventing the slider from being moved.

Furthermore, FIG. 10 shows a fifth embodiment of the present invention illustrating a further example of the one-way latch means.

In this embodiment, the locking plate 76 is inserted into a hole 100 formed in the slide piece 60. If a pin 102 racked across the slide piece 60 is inserted into a slot 104 formed in the locking plate 76, then the locking plate 76 can move in the directions indicated by arrows A and B. A compression coil spring 106 is confined between the locking plate 76 and the slide piece 60 to bias the locking plate 76 in the direction indicated by the arrow A.

In this embodiment as arranged above, when the door is closed, the locking plate 76 is projected into the guide groove 32 to function as the one-way latch means in the same manner as in the previous embodiments.

As has been described in the abovedescribed embodiments, the seatbelt system according to the present invention has very simple construction, in which the locking plate is projected into the moving path of the slider and the one-way latch means is provided which enables the slider to move to the automatically fastening position, and offers such excellent advantages that the end portions of the webbing can be reliably engaged with the vehicle body in the automatically fastened condition of the webbing, thereby improving the safety of the occupant.

What is claimed is:

1. A seatbelt system, wherein an occupant restraining webbing is automatically fastened to an occupant after said occupant enters a vehicle, comprising:
    (a) a guide rail in which the central portion thereof is laid on a roof side of the vehicle in the substantially horizontal direction and the rear end portion thereof is made to hang down vertically along a center pillar of the vehicle;
    (b) a slider engaging an outer end portion of an occupant restraining webbing, being guided by said guide rail, and being moved from a webbing automatically fastening position disposed in the rear end portion of said guide rail to an unfastening position disposed in the forward end portion of said guide rail;
    (c) a door checker projected outwardly from the vehicle and adapted to be pushed into the vehicle body by a closing force of the vehicle door when said vehicle door is closed;
    (d) a slide piece disposed in the center pillar, connected to said door checker, and moved laterally of the vehicle by said door checker; and
    (e) a locking plate secured to said slide piece and projected into the moving path of the slider by a resilient member confined between the slide piece and the locking plate, the projecting end of which is of a triangular shape and abuts against the slider when the slider is moved to the automatically fastening position, whereby said resilient member is flexed to allow the locking plate to go out of the moving path of the slider, so that the slider can be prevented from moving from the automatically fastening position to the unfastening position, thereby reliably restraining the occupant even when the vehicle is turned over.

2. A seatbelt system as set forth in claim 1, wherein said locking plate is guided by a letter 'U' shaped guide plate solidly secured to said slide piece.

3. A seatbelt system as set forth in claim 1, wherein said door checker is connected to said slide piece through a wire.

4. A seatbelt system as set forth in claim 1, wherein said locking plate is pivotally connected to an end portion of said slide piece, and a torsion spring is provided between said locking plate and said slide piece.

5. A seatbelt system as set forth in claim 1, further comprising a tape within said guide rail to move said slider.

* * * * *